United States Patent
Michiba

(10) Patent No.: US 7,036,968 B2
(45) Date of Patent: May 2, 2006

(54) VEHICULAR LAMP WITH COVER INCLUDING CYLINDRICAL LENS STEP PORTION

(75) Inventor: Naruhiro Michiba, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 142 days.

(21) Appl. No.: 10/657,767

(22) Filed: Sep. 8, 2003

(65) Prior Publication Data

US 2004/0057248 A1    Mar. 25, 2004

(30) Foreign Application Priority Data

Sep. 10, 2002   (JP)   .............................. 2002-263600

(51) Int. Cl.
*F21V 5/04* (2006.01)
(52) U.S. Cl. ...................... 362/520; 362/375; 362/507; 362/546
(58) Field of Classification Search ................. 362/96, 362/487, 507, 546, 513, 514, 520, 362, 375
See application file for complete search history.

(56) References Cited

U.S. PATENT DOCUMENTS 6,520,659 B1 *   2/2003   Nishiyama et al. ........... 362/96

FOREIGN PATENT DOCUMENTS

JP            7-41833          7/1995
JP            11-306803        11/1999

* cited by examiner

*Primary Examiner*—Alan Cariaso
*Assistant Examiner*—Ismael Negron
(74) *Attorney, Agent, or Firm*—Koda & Androlia

(57) ABSTRACT

A vehicular lamp including a resin-made plain outer cover that covers the lamp body. The plain outer cover has an interior lens step (cylindrical step) formed in a region that faces a gap between an extension element (or a reflector) installed in the lamp body and the inner surface of a leg portion of the outer cover. The lens step optically reduces the gap between the leg portion and the extension element (or a reflector) and thus optically magnifies the leg portion of the outer cover, allowing the lamp to have a sense of stateliness and a sense of luxury seen in the lamp that uses a glass-made outer cover.

2 Claims, 6 Drawing Sheets

VEHICULAR LAMP WITH COVER INCLUDING CYLINDRICAL LENS STEP PORTION

BACKGROUND OF THE INVENTION

1. Field of the Invention

The present invention relates to a vehicular lamp and more particularly to a vehicular lamp that has a resin-made plain outer cover.

2. Prior Art

A lamp for a vehicle such as an automobile (merely called a "lamp") is basically comprised of a lamp body and a lens. The lamp body has a light source, a light reflecting member such as a reflector, an extension element and the like; and its front opening is covered by the lens.

Some of the recent vehicular lamps are configured such that a lamp unit is installed in the lamp body, and the front opening of the lamp body is covered with a plain outer cover. The plain cover is made of a translucent material and has a flat surface and a uniform thickness without any lens steps. In such a lamp, a glass-made plain outer cover is typically used in order to provide a sense of luxury when the lamp is viewed from its front. In other words, a glass-made plain outer cover gives the lamp a sense of luxury because of the color tone of the glass. In addition, when a plain outer cover that has a leg portion formed around its decorative face portion which serves as a front surface region of the plain outer cover is viewed from the front, the leg portion, particularly its thickness, is visually appealing and gives a sense of thickness, and this sense of thickness creates a sense of massiveness for the plain outer cover and provides the lamp with a sense of stateliness and a sense of luxury.

Materials for plain outer covers have been, however, changing in recent years from glass to polycarbonate resin (PC) or the like for the purpose of recycling the lamp and reducing the weight and cost of the lamp. If appropriate resin material is selected, a color tone that is similar to a glass-made plain outer cover is created, and a similar texture as a glass-made plain outer cover is provided for a resin-made plain outer cover.

However, a resin-made plain outer cover has a thinner decorative face portion and a leg surface portion compared to a glass-made plain outer cover. Therefore, the sense of thickness seen in the glass-made outer cover is not obtainable, and it is difficult to provide a lamp with a sense of massiveness and a sense of luxury which a glass-made outer cover can provide. Particularly, when a lamp is viewed from the front, the thickness of the leg portion that exists in a peripheral edge portion of the decorative face portion is generally easily observed through the decorative face portion. Therefore, due to this thin leg portion, the resin-made plain outer cover cannot provide a sufficient sense of thickness and massiveness.

The leg portion of a resin-made plain outer cover can be formed to have the same thickness as that of a glass-made plain outer cover. However, if the thickness of resin increases to the same level as that of a glass-made plain outer cover, a so-called "sink" occurs in the leg portion or the decorative face portion of the outer cover. This deteriorates the appearance of the outer cover, and thus, the lamp cannot have a sense of luxury.

Furthermore, in an ordinary lamp, there is a gap between an extension element installed in the lamp body and the inner surface of the leg portion of the outer cover; and this type of gap is provided also between the peripheral edge of a reflector and the inner surface of the leg portion of the outer cover. These gaps are provided so that the extension element and the reflector do not come into contact with the leg portion of the outer cover. However, such gaps allow the leg portion of the outer cover to be seen through the decorative portion of the outer cover, and the thin leg portion deteriorates the overall appearance of a lamp.

Japanese Patent Application Laid-Open (Kokai) No. 11-306803 and Japanese Utility Model Application Laid Open No. 07-41833, for instance, disclose various lens structures for automobile lamps. The lens in these publications are made of resin, and regions of different thickness or lens steps are formed in the lenses so that lamps can have improved light distribution characteristics and an improved appearance. However, even in these structures, the resin-made lenses do not have such a sense of thickness or a sense of massiveness as that of glass-made lenses.

SUMMARY OF THE INVENTION

It is, therefore, an object of the present invention to provide a vehicular lamp that has a sense of stateliness and a sense of luxury by the use of a plain outer cover made of resin without increasing the thickness of the leg portion.

The above object is accomplished by a unique structure of the present invention for a vehicular lamp that includes a lamp body, a light source installed in the lamp body, and a resin-made plain outer cover that covers the front opening of the lamp body; and this plain outer cover is comprised of:

a decorative face portion that faces the front opening of the lamp body, a leg portion that extends along the peripheral edge portion of the decorative face portion, and a cylindrical step formed on the inner surface of a region that lies along the leg portion of the decorative face portion or on the inner surface of a region where the leg portion meets the peripheral edge portion of the decorative face portion.

Furthermore, the above object is accomplished by another unique structure of the present invention for a vehicular lamp in which the front opening of its lamp body is covered with a resin-made plain outer cover, and this plain outer cover has:

a lens step formed in a region that faces a gap between the inner surface of the plain outer cover and a reflector installed in the lamp body or the gap between the inner surface of the plain outer cover and an extension element installed in the lamp body, so that the lens step functions to optically reduce the gap.

As see from the above, in the vehicular lamp of the present invention that includes a resin-made plain outer cover, the light refraction action is made by the lens step in a form of, for instance, a cylindrical step, that is formed inside the plain outer cover; and this light refraction action allows the leg portion of the plain outer cover to appear to be thicker. In other words, the gap between the inner surface of the outer cover and the reflector or the gap between the inner surface of the outer cover and the extension element appears to be optically reduced; as a result, the vehicular lamp can have substantially the same sense of stateliness and luxury as a lamp that uses a glass-made plain outer cover.

DETAILED DESCRIPTION OF THE INVENTION

Figure 1:
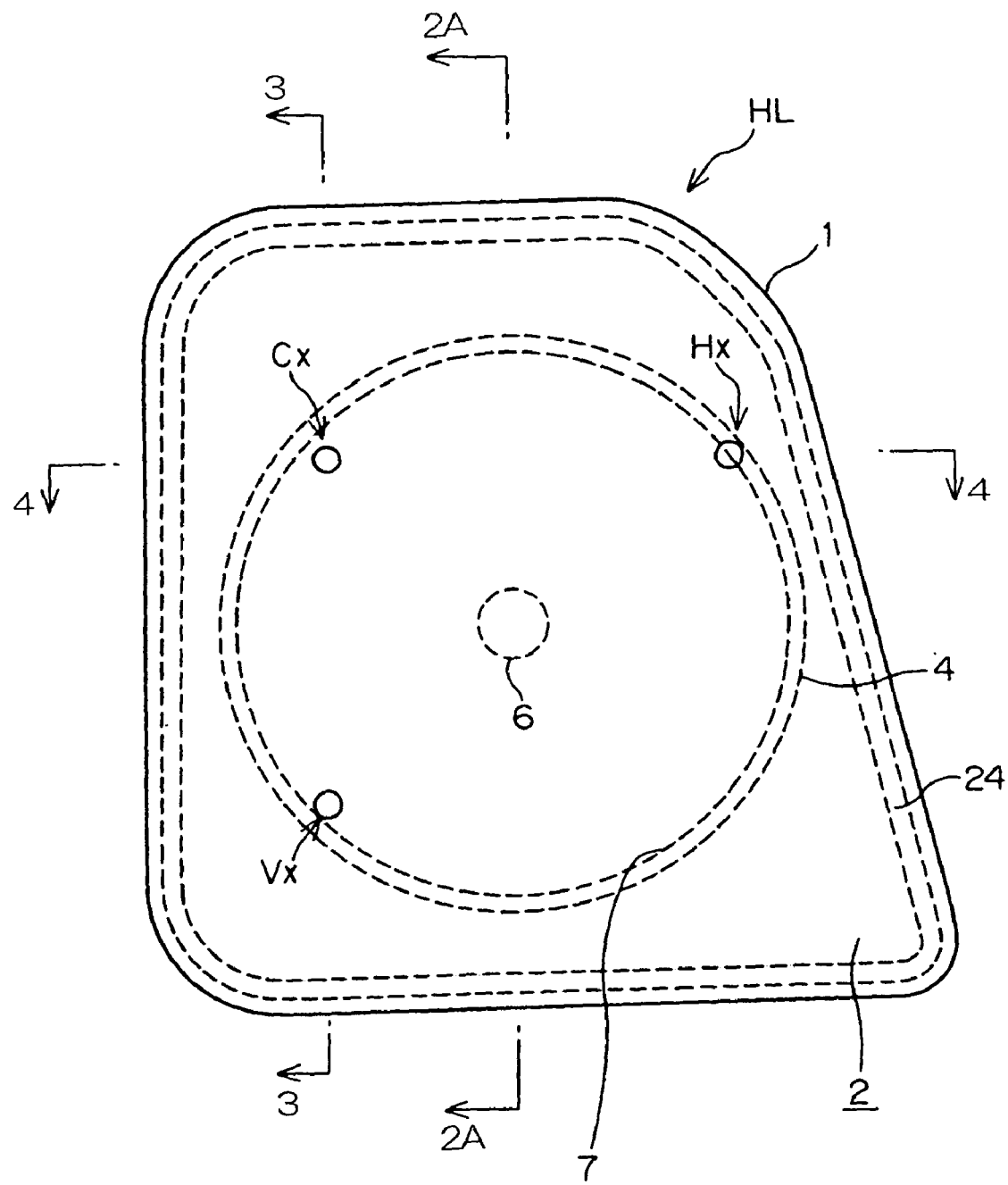
FIG. 1 is a front elevational view of the vehicular lamp according to the first embodiment of the present invention.

A detailed description of the embodiments of the present invention will be given below with reference to the accompanying drawings.

The drawings show a headlamp HL which is used as a low beam lamp for a four-light lamp. The lamp HL includes a resin-molded lamp body 1, a resin-made plain outer cover 2 that is attached to and covers the front opening of the lamp body 1, and a reflector 4 installed in the lamp chamber 3 which is constituted by the lamp body 1 and the plain outer cover 2. A light bulb 6 that serves as a light source is attached to the reflector 4 via a bulb socket 5, and an extension element 7 is also provided inside the lamp body 1. The extension element 7 is disposed along the front edge portion of the reflector 4 so that it prevents the inner surface of the lamp body 1 from being exposed from the front through a gap between the lamp body 1 and the reflector 4. The reference numeral 8 is a shade 8. The shade 8 is disposed in front of the light bulb 6 in order to prevent direct light from the light bulb 6 from being radiated to the outside of the headlamp HL.

The lamp body 1 is in a container-shape, and a sealing groove 11 is formed along the periphery of its front opening. The plain outer cover 2, which is made of a resin material, is comprised of a decorative face portion 21, which serves as a radiation operative surface, and a leg portion 22, which protrudes in a wall-like shape or in a cylindrical shape rearward from the peripheral edge portion of the decorative face portion 21. The decorative face portion 21 and the leg portion 22 are integrally formed of polycarbonate (PC) or the like.

The decorative face portion 21 transmits light emitted by the light bulb 6 and reflected by the reflector 4 and emits the light with predetermined distribution characteristics. The edge portion 23 of the leg portion 22 is inserted in the sealing groove 11 of the lamp body 1, and sealing is executed thereto by fixation with a sealing agent 12 filled in the sealing groove 11.

The lamp body 1 has a bulb socket insertion hole 13 opened at a substantially central position of its rear wall. A circular rubber cap 51 is attached between the bulb socket insertion hole 13 and the bulb socket 5 which is attached in a bulb socket attachment hole 4b of the reflector 4. With this structure, the reflector 4 is movably in the lamp body 1 so that an aiming operation which will be described below is accomplished and so that a gap between the reflector 4 and the lamp body 1 is sealed.

Figure 3:
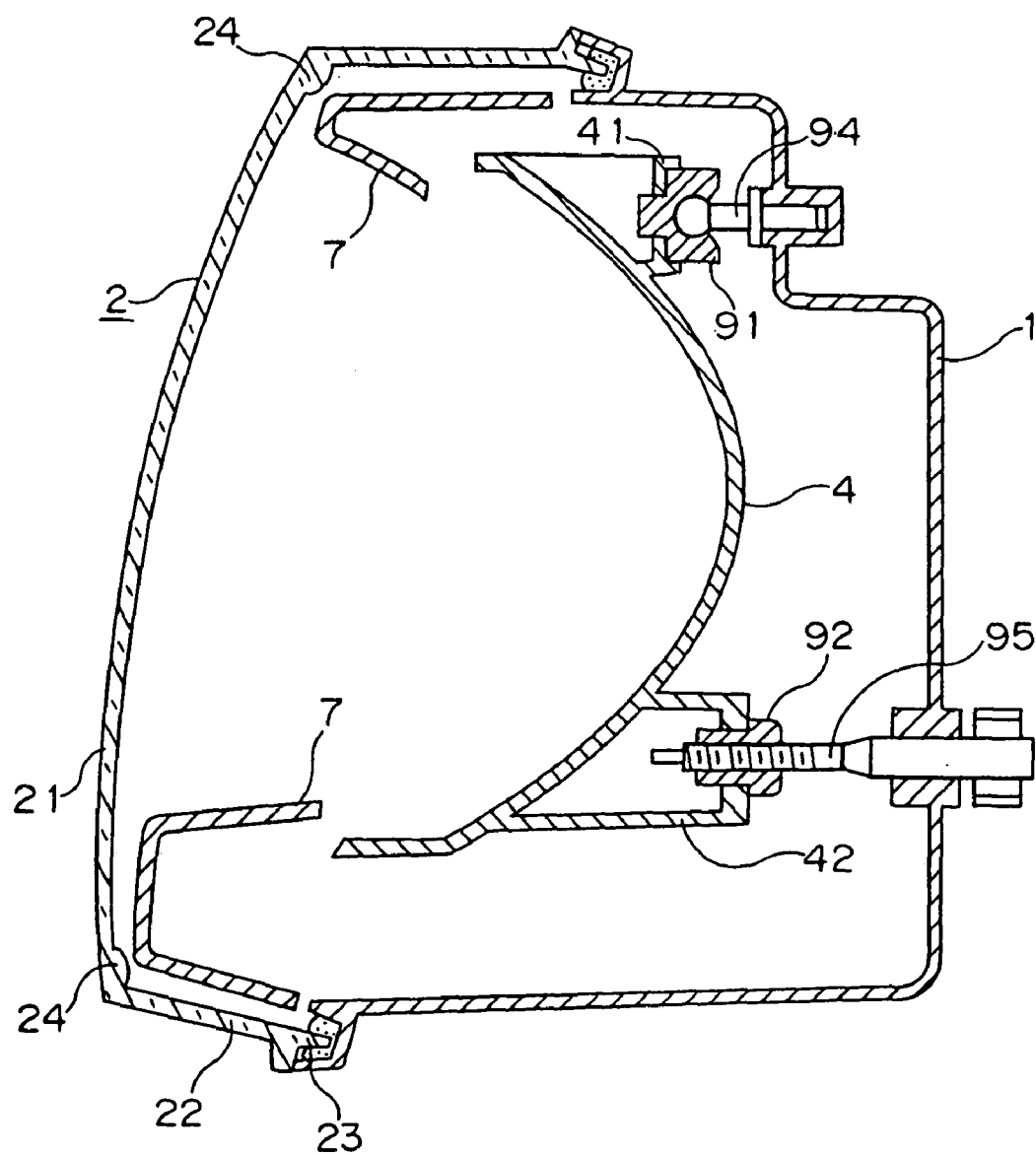
FIG. 3 is a sectional view taken along the line 3—3 in FIG. 1.
Figure 4:
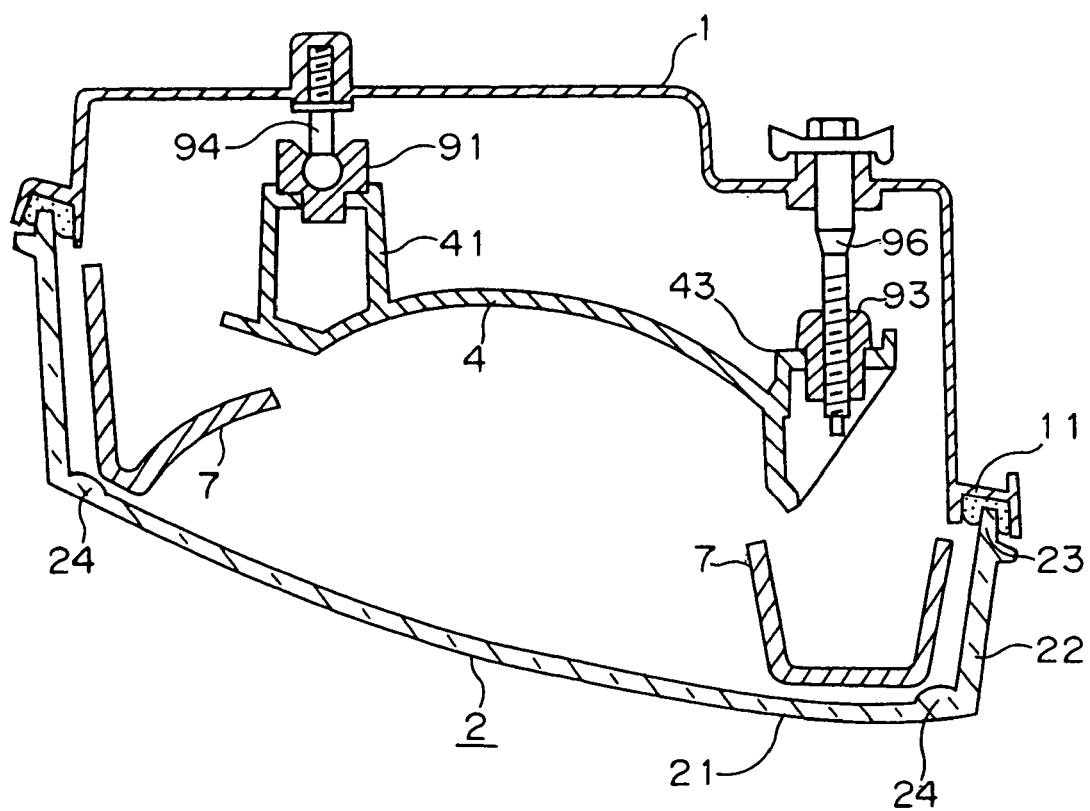
FIG. 4 is a sectional view taken along the line 4—4 in FIG. 1.

As seen from FIG. 3 and FIG. 4, three stems, a fulcrum stem 41, a vertical aiming stem 42, and a lateral aiming stem 43, are integrally formed on the back surface of the reflector 4 to constitute an aiming mechanism. The fulcrum stem 41 is formed on one side of the upper portion of the back surface of the reflector 4, and the vertical aiming stem 42 is formed directly below the fulcrum stem 41. The lateral aiming stem 43 is formed at the same height as the fulcrum stem 41, and it is located at a position horizontally opposite from the bulb socket attachment hole 4b. All these stems 41, 42 and 43 are formed in a box-shape or a hollow-cylindrical shape, and they protrude rearward in the direction of an optical axis from the back surface of the reflector 4. A bearing nut 91 is fitted in a fitting hole formed in the rear end surface of the fulcrum stem 41, while aiming nuts 92 and 93 are respectively fitted in a fitting hole of a rear end surface of the vertical aiming stem 42 and the lateral aiming stem 43. The bearing nut 91 attached by being fitted in the fulcrum stem 41 is engaged with a bearing ball shaft 94 secured to the inner surface of the lamp body 1. The aiming nuts 92 and 93, which are attached by being fitted in the vertical aiming stem 42 and the lateral aiming stem 43, respectively, are screwed to a vertical aiming screw 95 and a lateral aiming screw 96. The vertical aiming screw 95 and the lateral aiming screw 96 pierce an upper portion of the inner surface of the lamp body 1 so as to be supported in the direction of the optical axis.

As seen from FIG. 1, in the above-described aiming mechanism 9, the bearing nut 91 and the bearing ball shaft 94 constitute a fulcrum portion Cx, the aiming nut 92 and the vertical aiming screw 95 constitute a vertical aiming point Vx, and the aiming nut 93 and the lateral aiming screw 96 constitute a lateral aiming point Hx.

Accordingly, by way of rotating (right or left) the lateral aiming screw 96 that serves as one element of the lateral aiming point Hx from the outside of the back surface of the lamp body 1, the lateral aiming nut 93 which is screwed to the lateral aiming screw 96 is moved forward and backward along the lateral aiming screw 96. As a result, the reflector 4 tilts, via the lateral aiming stem 43, around the fulcrum portion Cx in the lateral direction, i.e., in the horizontal direction. On the other hand, by way of rotating (right or left) the vertical aiming screw 95 that serves as one element of the vertical aiming point Vx, the vertical aiming nut 92 which is screwed to the vertical aiming screw 95 is moved forward or rearward along the vertical aiming screw 95. As a result, the reflector 4 tilts, around the fulcrum portion Cx, in the vertical direction, i.e., that is, in the vertical direction. The aiming adjustment for adjusting the direction of the optical axis of the reflector 4 is thus accomplished.

Figure 2A:
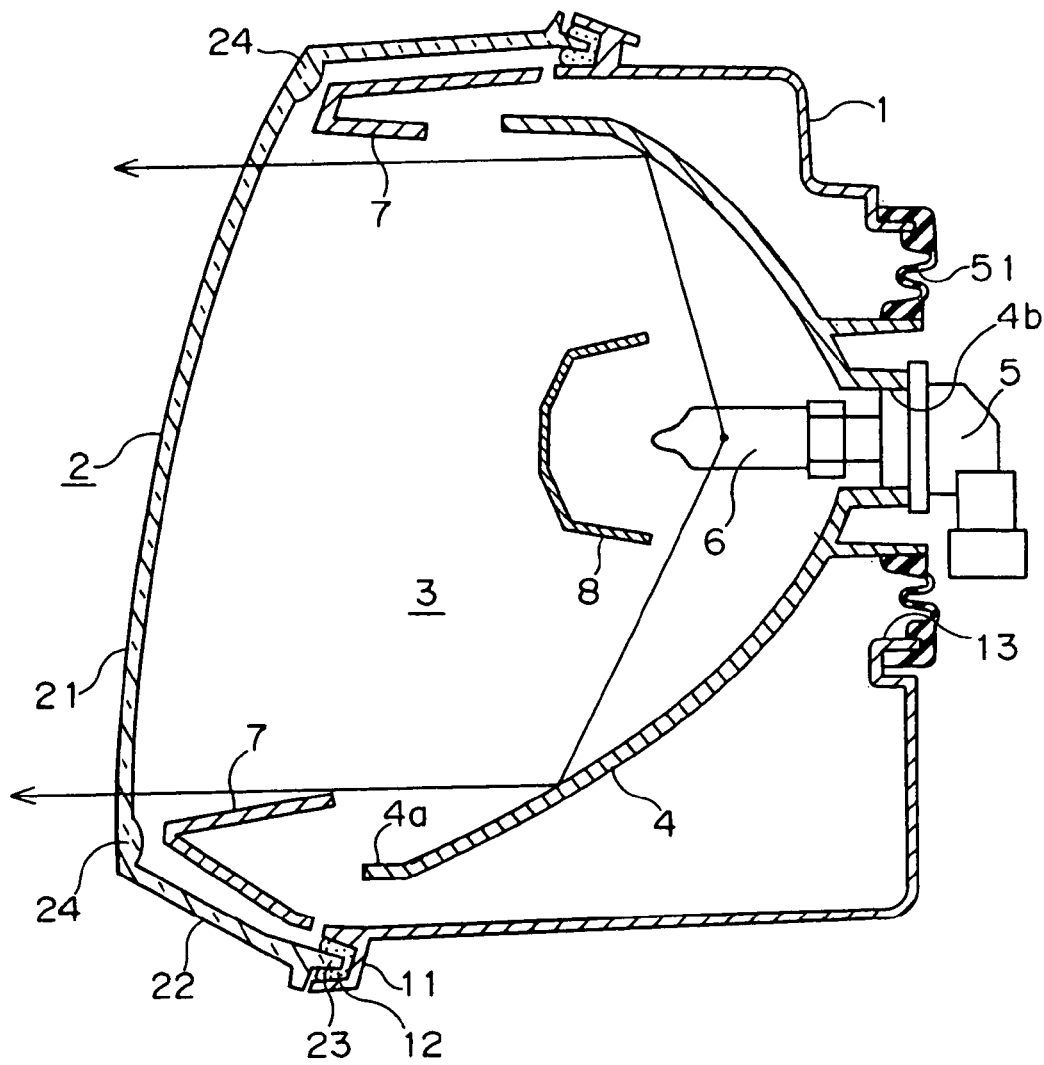
FIG. 2A is a sectional view taken along the line 2A—2A in FIG. 1.

As seen from FIG. 2A, the front edge portion 4a of the reflector 4 is positionally separated from the inner surface of the lamp body 1 by a predetermined dimension so that the above-described aiming adjustment is made. This structure causes the inner surface of the lamp body 1 to be seen from the outside through the gap between the front edge portion 4a of the reflector 4 and the inner surface of the lamp body 1 and through the decorative face portion 21 of the plain outer cover 2, thus deteriorating the overall appearance of the lamp. For this reason, the extension element 7 is disposed so as to cover the gap between the front edge portion 4a of the reflector 4 and the front opening of the lamp body 1. The extension element 7 is, as in the case of the reflector 4, formed by performing an aluminum vapor deposition treatment on the surface of a resin-molded product. As a result, the reflector 4 and the extension element 7 appear completely in harmony when the interior of the lamp is seen from the outside through the plain outer cover 2. In order to prevent interference between the peripheral edge portion of the extension element 7 and the inner surface of the leg portion 22 of the plain outer cover 2, as seen from FIG. 2B, a predetermined gap d is secured between the extension element 7 and the leg portion 22.

Meanwhile, as described above, the plain outer cover 2 has a shape that corresponds to the front opening of the lamp body 1. The outer cover 2 is comprised of the decorative face portion 21, which has a predetermined curved surface along the curving shape of the front portion of an automobile, and the wall-shaped leg portion 22, which protrudes rearward from the periphery of the decorative face portion 21. The plain outer cover further includes the lens step 24. The lens step 24 is, as best seen from FIG. 2B, formed in a region that is opposite to or faces the gap d between the extension element 7 and the inner surface of the leg portion 22. The lens step 24 forms an image such that the inner surface of the leg portion 22, which faces the gap d, is offset toward the extension element 7 side when the gap d is observed from the outside of the outer cover 2. Due to the lens step 24, the gap d appears to be reduced (or to be smaller that it actually is) and inconspicuous when it is seen through the decorative face portion 21 of the plain outer cover 2 from the outside. In this embodiment, the lens step 24 is a cylindrical step that has an arc-shaped cross section and is formed on the inner surface of a region that spreads along the entire periphery of the front opening of the lamp body 1 and circularly extends along the leg portion 22 of the decorative face portion 21. Moreover, the cylindrical step 24 which thus serves as the lens step is formed in such a region that light source light, which is emitted from the light bulb 6 and transmitted through the plain outer cover 2, is not directed to the cylindrical step 24. Accordingly, light distribution characteristics of the light source light emitted through the plain outer cover 2 are not affected.

Figure 5:
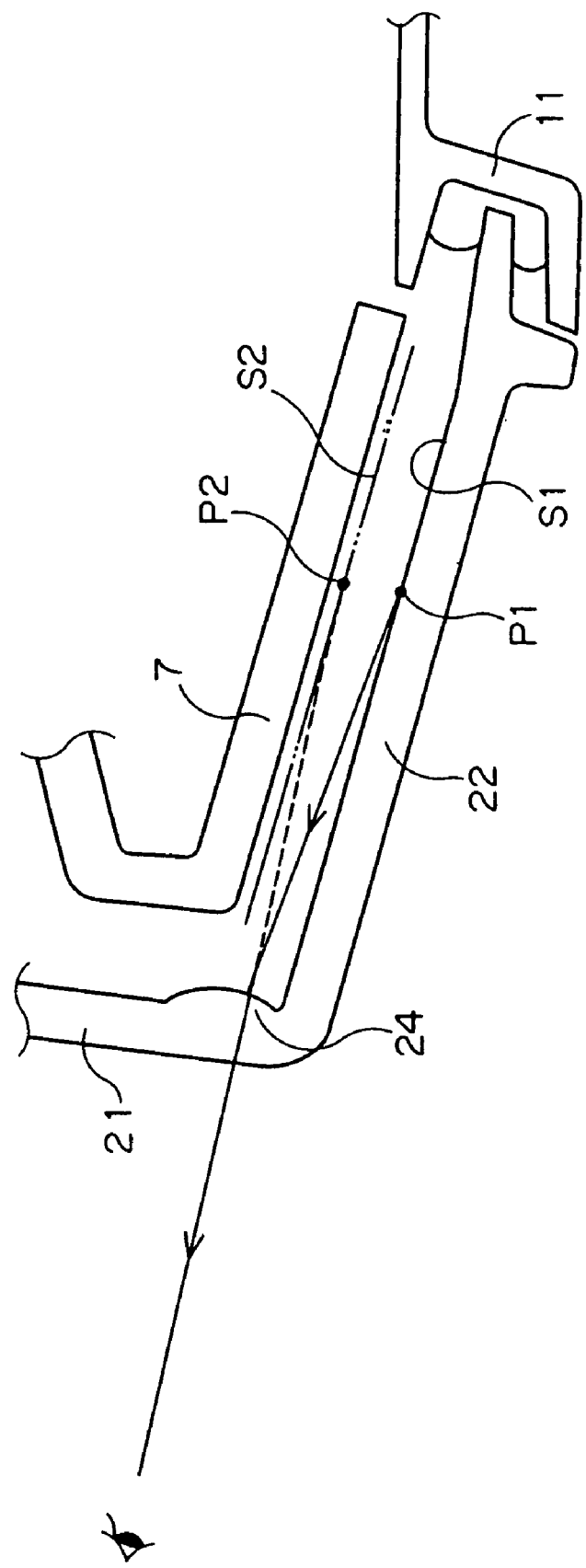
FIG. 5 illustrates the optical action of the cylindrical step formed in the outer cover.

By way of appropriately setting the curvature of the cylindrical step 24 or by way of appropriately setting the focal position of the cylindrical step 24 in the width direction of the gap d, the leg portion 22 appears to be optically magnified (or to be larger than it actually is) in the thickness direction, as shown in FIG. 5, when the plain outer cover 2 is viewed from the outside of the decorative face portion 21. More specifically, in FIG. 5, light from a point P1 on the inner surface S1 of the leg portion 22 is refracted by the cylindrical step 24 and emitted to the outside of the plain outer cover 2. Accordingly, a virtual image of the point P1 is formed at a point P2 when viewed from the front of the plain outer cover 2. Since similar virtual images of the plurality of points of the inner surface S1 of the leg portion 22 are formed, the image of the inner surface S1 is formed near the extension element 7 as shown by the chain double dashed line S2 in FIG. 5. This makes the leg portion 22 appear substantially thick when the leg portion 22 is viewed from the front of the plain outer cover 2. As a result, the plain resin-made outer cover 2 appears as if it is a glass-made plain outer cover; and the resin-made plain outer cover 2 has a sense of massiveness, allowing the headlamp HL to have a sense of stateliness and luxury.

Figure 6:
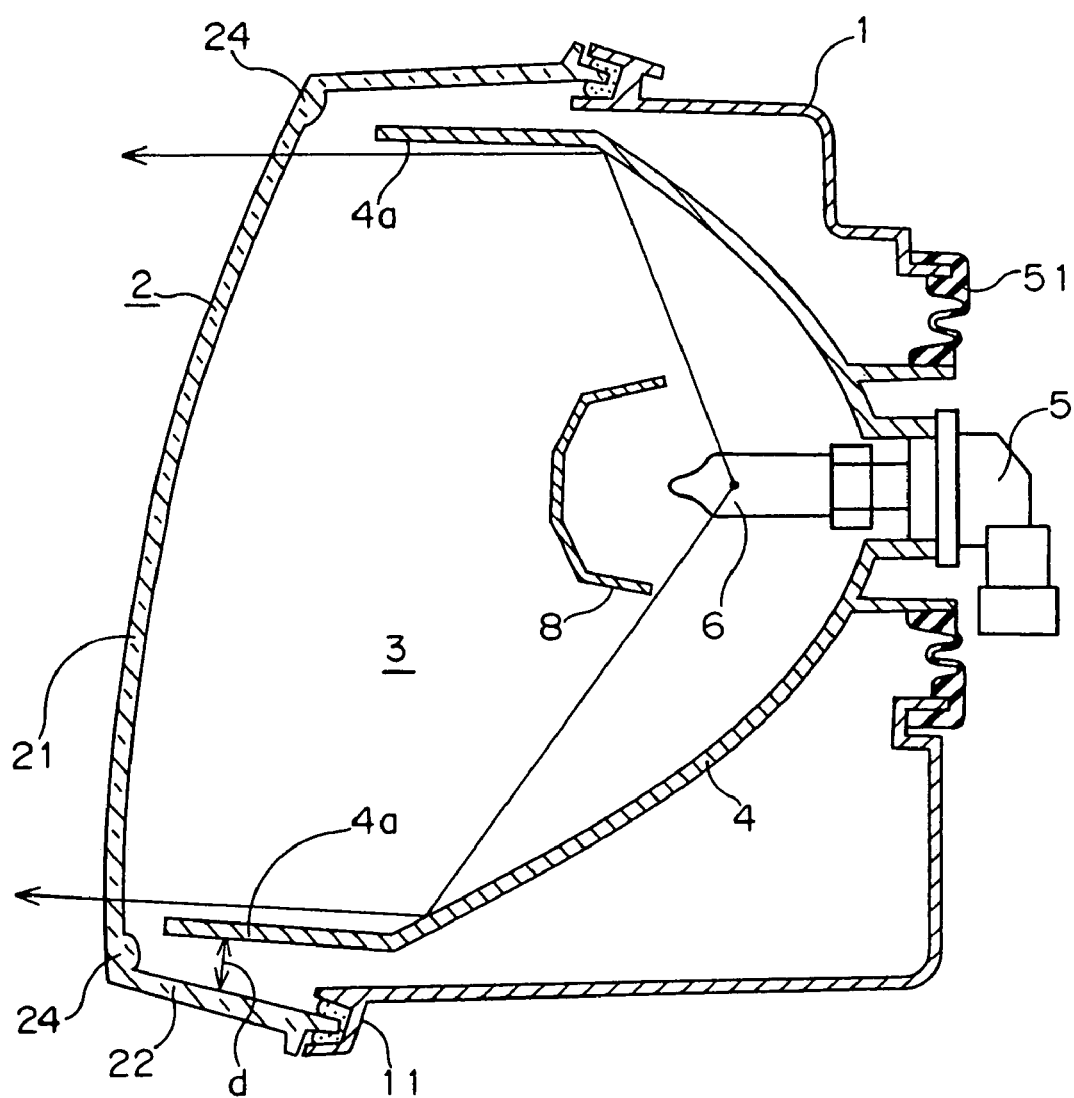
FIG. 6 is a sectional side view of the second embodiment of the present invention, being similar to FIG. 2.

FIG. 6 shows in cross section the second embodiment of the present invention. Compared to the lamp according to the first embodiment shown typically in FIG. 2, in this second embodiment, the present invention is applied to a lamp that is not provided with an extension element. The same reference numerals are used in FIG. 6 for the elements equivalent to those in the lamp of the first embodiment.

More specifically, in the lamp of the second embodiment, the front edge portion 4a of the reflector 4 is located close to the inner surface of the lamp body 1 so that aiming adjustment is executed by tilting the entire lamp. In this type of lamp, the reflector 4 is attached in a fixed manner in the lamp body 1 so that the front edge portion 4a of the reflector 4 is disposed close to the inner surface of the leg portion 22 of the outer cover 2. As a result, the extension element 7 shown in the first embodiment is not employed.

In this lamp, there is a gap d between the leg portion 22 of the thin resin-made plain outer cover 2 and the front edge portion 4a of the reflector 4; and because of this gap d, the leg portion 22 would appear to be thin. However, the outer cover 2 has the cylindrical step 24 that is formed in a region that spreads along the leg portion 22 of the decorative face portion 21 of the plain outer cover 2. As a result, the gap d between the reflector 4 and the leg portion 22 of the plain outer cover 2 appears to be reduced, and the leg portion 22 appears substantially thicker. Thus, the outer cover 2 has a sense of massiveness in appearance, and the lamp has a sense of stateliness and luxury.

In this embodiment as well, the cylindrical step 24 is formed in such a region that light source light, which is emitted from the light bulb 6 and passes through the plain outer cover 2, is not directed to the cylindrical step 24. Accordingly, the light distribution characteristics of the light source light emitted through the plain outer cover 2 are not affected.

Figure 2B:
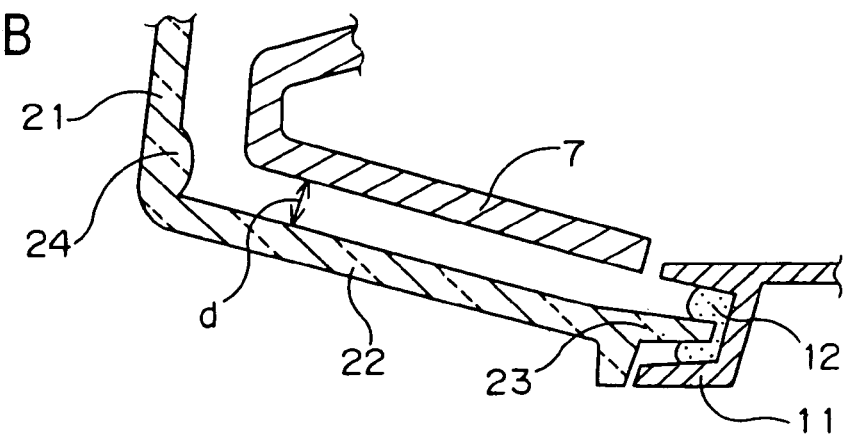
FIG. 2B is an enlarged illustration of the lower potion of FIG. 2A.

In each of the above embodiments, the cylindrical step 24 is, as best seen from FIGS. 2B, 5 and 6, formed in a convex lens shape and is disposed on the inner surface of the decorative face portion of the plain outer cover (or along the inside corner portion where the leg portion 22 meets the decorative face portion 21) so as not to expose the gap between the leg portion of the outer cover and the extension element or the gap between the leg portion of the outer cover and the reflector. However, the cross section of the curved surface shape of the cylindrical step is not limited to an arc or a convex as long as the cylindrical step has an optical effects of offsetting the inner surface of the leg portion of the outer cover inward, and various curved surfaces including a partial arc surface such as a half arc shape, an elliptic surface, a paraboloid, and the like can be employed.

Further, the curved surface shape is not limited to a convex shape. Instead, it can be a concave curved surface. In some cases, the curved surface can be formed into a wave-like step formed by consecutive plurality of curved surfaces. However, since a cylindrical step that has a single convex shape has a smooth surface, such a cylindrical step does not become conspicuous in the decorative face portion which is a relatively flat and even surface, and the outer cover looks as if it is made of glass without causing a feeling of strangeness with respect to the decorative face portion.

In each of the embodiments above, the present invention is described on a single lamp. However, it is needless to say that the present invention is applicable to a resin-made plain outer cover used for a vehicle lamp in which a plurality of lamps are integrated.

As see from the above, in the present invention, a cylindrical step is formed on the inner surface of a region that spreads along the leg portion of a decorative face portion of a resin-made plain outer cover that covers the front opening of a lamp body. Accordingly, the leg portion of the plain outer cover appears thicker than it actually is; and a sense of stateliness and a sense of luxury, which are equivalent to a lamp that uses a glass-made plain outer cover, are provided for the lamp. In particular, in the vehicular lamp of the present invention, the cylindrical step optically reduces the gap between the inner surface of the outer cover and a reflector or the gap between the inner surface of the outer cover and an extension element, so that the leg portion appears substantially thicker. Accordingly, the lamp has a sense of stateliness and a sense of luxury as in the lamps that use glass-made plain outer covers.

The invention claimed is:

1. A vehicular lamp including a lamp body, a light source installed in said lamp body, and a resin-made plain outer cover that covers a front opening of said lamp body, wherein said plain outer cover is comprised of:
   a decorative face portion that faces said front opening of said lamp body,
   a leg portion extending along a peripheral edge portion of said decorative face portion, and
   a cylindrical lens step formed on an inner surface of a region that lies along said leg portion of said decorative face portion, and wherein
   said cylindrical lens step is formed in a region that faces a gap between an inner surface of said plain outer cover and a reflector which is installed in said lamp body, said cylindrical lens step functioning to optically reduce said gap.

2. A vehicular lamp including a lamp body, a light source installed in said lamp body, and a resin-made plain outer cover that covers a front opening of said lamp body, wherein said plain outer cover is comprised of:
   a decorative face portion that faces said front opening of said lamp body,
   a leg portion extending in a cylindrical shape rearward along a peripheral edge portion of said decorative face portion, and
   a cylindrical lens step formed on an inner surface of a region that lies along said leg portion of said decorative face portion, and wherein
   said cylindrical lens step is formed in a region that faces a gap between an inner surface of said plain outer cover and an extension element which is installed in said lamp body, said cylindrical lens step optically functioning to reduce said gap.

* * * * *